United States Patent [19]

Koshino et al.

[11] Patent Number: 4,922,280
[45] Date of Patent: May 1, 1990

[54] INFRARED FILTER COVER PLATE FOR AUTOFOCUS CAMERA

[75] Inventors: Susumu Koshino; Yuji Ogawa, both of Tokyo, Japan

[73] Assignee: Asahi Kogaku Kogyo Kabushiki Kaisha, Tokyo, Japan

[21] Appl. No.: 328,744

[22] Filed: Feb. 24, 1989

Related U.S. Application Data

[63] Continuation of Ser. No. 89,451, Aug. 26, 1987, abandoned.

[51] Int. Cl.⁵ .................................................. G03B 3/00
[52] U.S. Cl. ...................................... 354/403; 354/482
[58] Field of Search ................................. 354/403, 482

[56] References Cited

U.S. PATENT DOCUMENTS

| | | | |
|---|---|---|---|
| 3,813,679 | 5/1974 | Hasegawa et al. | 354/403 |
| 3,820,129 | 6/1974 | Hosoe et al. | 354/403 |
| 4,274,735 | 6/1981 | Tamura et al. | 354/403 |
| 4,358,186 | 11/1982 | Johnson et al. | 354/482 |
| 4,533,241 | 8/1985 | Masunaga et al. | 354/403 |
| 4,549,801 | 10/1985 | Winter | 354/403 |

*Primary Examiner*—Russell E. Adams
*Attorney, Agent, or Firm*—Sughrue, Mion, Zinn, Macpeak & Seas

[57] ABSTRACT

A filter plate for an infrared range finder in a camera, which has a flat front surface and transmits infrared but absorbs visible radiation. Thereby, the range finder is protected from dirt and scratches and noise from visible radiation is reduced. It is possible to form lenses for the range finder on the back surface of the filter plate.

8 Claims, 3 Drawing Sheets

INFRARED FILTER COVER PLATE FOR AUTOFOCUS CAMERA

This is a continuation of application Ser. No. 089,451, filed Aug. 26, 1987, now abandoned.

BACKGROUND OF THE INVENTION

1. Field of the Invention

This invention relates to cameras. In particular, it relates to a filter for an autofocus mechanism of the camera.

2. Background of the Invention

There has been much recent interest in so-called compact cameras using 35 mm film. These cameras are smaller than a single lens reflex camera and lack many of the sophisticated features of the latter. With their decreased size, compact cameras can be easily carried about and their simple usage appeals to many inexperienced photographers.

However, some compact cameras have been designed with more sophisticated features. An example is an autofocusing zoom-lens compact camera which is described in PCT Patent Application PCT/JP No. 87/00293 filed at the Japanese Patent Office on May 12, 1987 with the United States being designated for filing. This application, incorporated herein by reference, is commonly assigned with this application.

The lens position is focused in accordance with a measured distance U between film plane F and the object O. The distance measuring device or range finder disclosed in the above application is schematically represented in FIG. 1 and relies upon a triangulation method. A light emitting diode 10 emits infrared radiation which is collimated by an emitting lens 12 of focal length f into a well defined beam to fall on the object O. The infrared light is reflected, usually diffusely, from the object O and part of the reflected light travels back to the camera where it is focused into a spot on a linear photoarray 14 by a receiving lens 16, also of focal length f. The separations between the light emitting diode 10 and the emitting lens 12 and between the receiving lens 16 and the photoarray 14 are both equal to the focal length f. The linear photarray 14 has many pixels and only one or two of the pixels will usually output an appreciable electrical signal when the reflected beam is focused on the photoarray. The displacement of the so activated pixel from the center of the linear photoarray is represented by t. Further, let the distance from the center of the photoarray 14 and the light emitter 10 be represented by L and the axial distance between the light emitting diode 10 and the film plane F be represented by d. Then, t is related to U by the equation $$t = Lf/(U - f - d). \qquad (1)$$

The electronic processing circuit for converting the measured value of t into that for U and hence for the required displacement of the main lens is not directly related to this invention and is not described because it should be obvious to the ordinary designer.

The above design presents several problems however. A compact camera is intended to be carried around without a carrying case. For that purpose, there is provided a shutter for the main lens. However, in a low cost compact camera, it would be desirable to not have to provide a corresponding shutter for the lenses 12 and 16 of the range finding section.

Another problem is that the infrared light emitted from the range finding section is relatively weak. Although the photoarray 14 is designed to be sensitive mainly to infrared radiation, a high level of ambient visible radiation will cause spurious signals to be output from the photoarray 14.

SUMMARY OF THE INVENTION

Accordingly, an object of the invention is to provide an infrared range finding section on an autofocusing camera that is protected from dust and scratches.

Another object of the invention is to provide such a range finding section that is not affected by ambient light.

A yet further object of the invention is to provide such features at low cost.

The invention can be summarized as a filter plate for being placed over the infrared range finding section on a camera which blocks visible radiation but passes infrared radiation.

DETAILED DESCRIPTION OF THE PREFERRED EMBODIMENT

Figure 1:
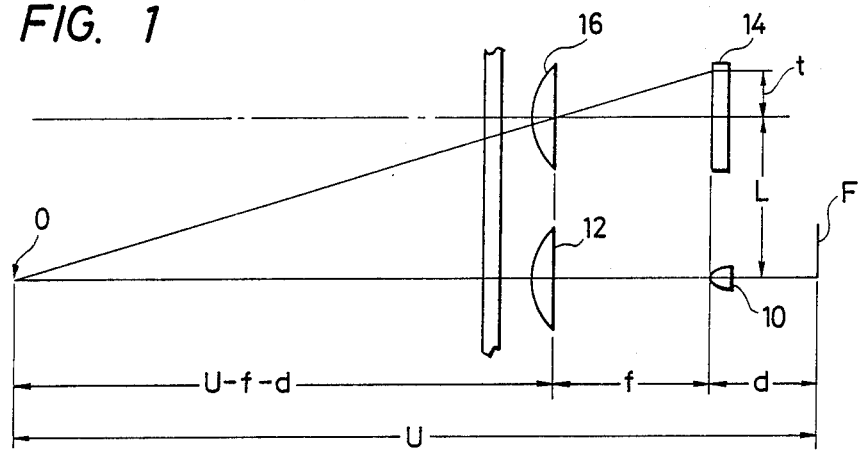
FIG 1 is a schematic representation of an infrared range finding system on a camera.
Figure 2:
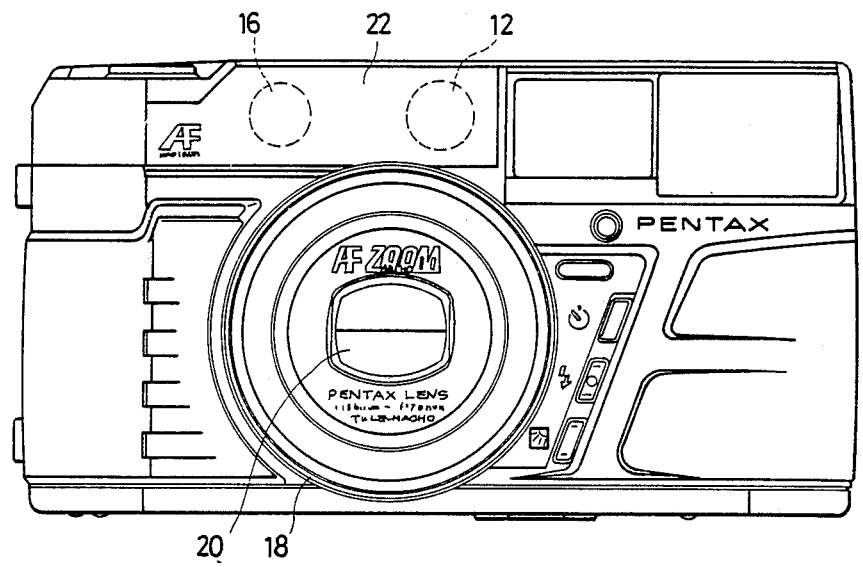
FIG. 2 is a front view of a compact camera to which the invention is applied.
Figure 3:
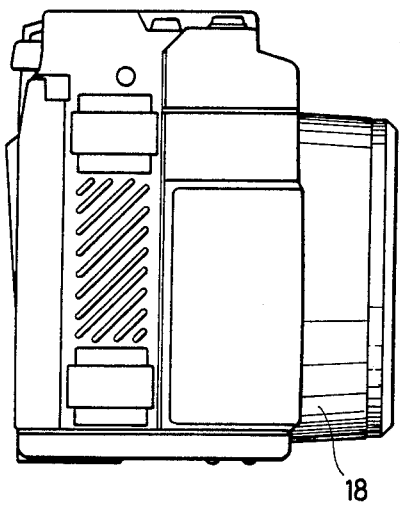
FIG. 3 is a side view of the camera of FIG. 2.

FIG. 2 shows a compact camera to which the invention is applied. FIG. 3 is a side view of the same. The range finding section of FIG. 1 is positioned generally above a main lens mount 18. Note that a shutter 20 protects the main lens from damage while the camera is not in use. According to the invention, a filter plate 12 covers the range finding section particularly in the area of the lenses 12 and 16 of that section. However, the filter plate 22 can extend further from the range finding section for general design purposes and may surround the lens mount 18 or cover the top portion of the camera.

Figure 4:
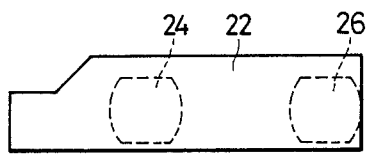
FIG. 4 is a front view of the filter plate of the invention.
Figure 5:
FIG. 5 is a top view of one embodiment of the filter plate of FIG. 4.

The filter plate 22 is shown by itself in FIGS. 4 and 5. It is composed of methyl methacrylate resin, that is, poly methyl methacrylate or PMMA, a plastic. It extends about 6 cm horizontally and about 1.5 cm vertically in the neighborhood of the lenses 12 and 16 of the rangefinding section. There is a cut corner intended primarily for esthetics. The filter plate 22 of this embodiment is planar and its thickness is approximately 1 mm. Such a flat shape is inexpensive to manufacture and easy to handle.

Figure 6:
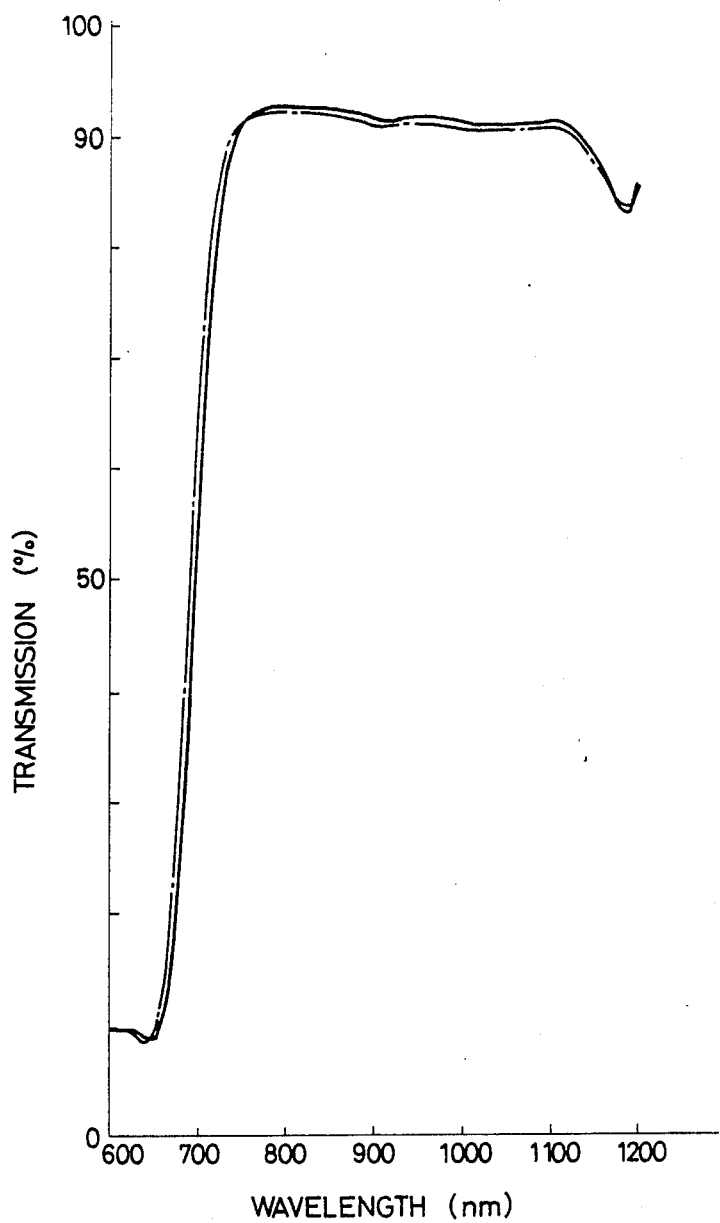
FIG. 6 is a transmission characteristic of the filter plate of the invention.

The filter plate 22 acts as an infrared pass filter which blocks most visible radiation. Its optical transmission spectrum is illustrated in FIG. 6. For reference, the light emitting diode 10 emits infrared radiation primarily at a wavelength of 880 nm. It is seen that the filter plate 22 passes infrared radiation at wavelength above about 700 nm but blocks visible radiation at wavelengths below about 700 nm. The transmission is approximately 10% in the visible region below 650 nm and is approximately 90% in the infrared region above 750 nm.

This type of aborption edge is accomplished by using in combination three color pigments, specifically solvent red with a color index of 152, solvent green of color index 3 and solvent yellow of color index 93. The total content of the three color pigments is 0.08 wt. % and their separate quantities were determined to achieve the transmission spectrum of FIG. 6.

The filter plate 22 is fitted into a recess in the camera body and is stuck thereto by adhesive. Thereby, the filter plate 22 is maintained generally flush with a generally flat front surface of the camera body.

Because of its absorption of visible radiation, the filter plate 22 appears to be black, the same color as most of the rest of the camera body. Thereby, the filter plate 22 contributes to an esthetically pleasing design.

As shown clearly in FIG. 4, a pattern or logo is printed onto the front surface of the filter plate 22. This pattern contributes to the overall esthetic design of the camera. Because of the flat surface of the filter plate 22, the printing can be easily performed by well known techniques.

The back surface of the filter plate 22 is coated with a dull black paint except in apertures 24 and 26 located in front of the lenses 12 and 16 of the range finding section. This black paint absorbs virtually all infrared and visible radiation and thus further contributes to the optical isolation of the photoarray 14.

Figure 7:
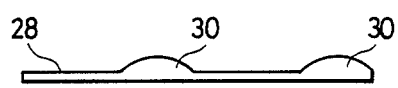
FIG. 7 is a top view of a second embodiment of the filter plate of FIG. 4.

In an alternative embodiment, illustrated in the top view of FIG. 7, the back surface a filter plate 28 is formed with lens portions 30 in the area of the light emitting diode 10 and the photoarray 14. These lens portions 30 allow the elimination of the lenses 12 and 16 of the range finding section of FIG. 1 because they perform the same focusing functions.

Figure 8:
FIG. 8 is a top view of a third embodiment of the filter plate of FIG. 4.

In yet a further embodiment shown in FIG. 8, the back surface of a filter plate 32 is formed with lens portions 34, similarly to the embodiment of FIG. 7. However, these lens portions 34 are formed by Fresnel lens patterns. This allows the use of the filter plate 32 with a relatively small maximum thickness.

Although the preceding embodiments all were applied to an infrared range finder which covered both the infrared emitter and the photodetector, the invention is not so limited and may be applied to other types of infrared range finders.

The invention provides an economical way to both protect the range finder and to increase its sensitivity while contributing to a pleasing camera design.

What is claimed is:

1. A camera, comprising:
   a camera body;
   an infrared range finding system enclosed in said body; and
   a filter plate having a generally front surface and fixed on an exterior surface of said camera body in a light path of said infrared range finding system and preferentially passing infrared radiation and blocking visible radiation,
   wherein said range finding system comprises an infrared emitter and an optical detector, said filter plate is a one-piece filter having two lens portions formed on an interior surface of said filter cooperating with said infrared emitter and detector, said filter covering said emitter and detector, said filter and said two lens portions being formed of the same material.

2. A camera as recited in claim 1, wherein said filter plate has a cutoff wavelength of approximately 700 nm.

3. A camera as recited in claim 1, wherein said filter plate comprises plastic.

4. A camera as recited in claim 3, wherein said filter plate is coated with a light absorber on an interior surface except in an area of said infrared emitter and said optical detector.

5. A camera as recited in claim 1, wherein said lens portions are in the form of Fresnel lenses.

6. A camera as recited in claim 1, wherein said filter plate extends to surround a lens mount of said camera.

7. A camera as recited in claim 1, wherein said filter plate extends to cover a top portion of said camera.

8. A camera as recited in claim 1, wherein said one-piece filter and said two lens portions are integrally formed.

* * * * *